United States Patent [19]
Rankin

[11] 3,817,329
[45] June 18, 1974

[54] PROCESS FOR PETROLEUM RECOVERY UTILIZING MISCIBLE FLUIDS

[75] Inventor: Malcolm R. Rankin, Foster Township, Pa.

[73] Assignee: Witco Chemical Corporation, New York, N.Y.

[22] Filed: July 27, 1972

[21] Appl. No.: 275,647

[52] U.S. Cl.................................. 166/274, 166/273
[51] Int. Cl.............................................. E21b 43/22
[58] Field of Search........................... 166/273–275, 166/305 R; 252/8.55 D

[56] References Cited
UNITED STATES PATENTS

| | | | |
|---|---|---|---|
| 3,195,629 | 7/1965 | Leach | 166/273 |
| 3,254,714 | 6/1966 | Gogarty et al. | 166/274 |
| 3,373,809 | 3/1968 | Cooke, Jr. | 166/275 X |
| 3,504,744 | 4/1970 | Davis, Jr. et al. | 166/274 X |
| 3,697,424 | 10/1972 | Holm | 166/275 X |

*Primary Examiner*—Stephen J. Novosad
*Attorney, Agent, or Firm*—Albert A. Gozzola; Jordan J. Driks; Morton Freidman

[57] ABSTRACT

Improved secondary or tertiary recovery techniques are disclosed utilizing as the initially injected slugs oil-external or water-external emulsions containing oxidized or amidized-oxidized products prepared from petroleum hydrocarbons and admixtures of same with untreated hydrocarbons as the oleaginous component.

9 Claims, No Drawings

PROCESS FOR PETROLEUM RECOVERY UTILIZING MISCIBLE FLUIDS

This invention relates to secondary-type recovery of petroleum fluids from subterranean reservoirs and more particularly to improvements in the miscible oil and drive fluid processes for the displacement of petroleum oils utilizing emulsions.

The use of the so-called soluble oil "slugs" in secondary recovery techniques is well known in the art and is disclosed, for example, in U.S. Pat. Nos. 3,254,714, dated June 7, 1966, to Gogarty et al.; 3,261,399, dated July 19, 1966, to Coppel; 3,266,570, dated Aug. 16, 1966, to Gogarty; and 3,307,268, dated Mar. 7, 1967, to Sena. Such processes disclose the use of various emulsions as flooding materials. These processes generally involve first the injection into the formation of a soluble oil slug, which is usually an oil-external emulsion containing a hydrocarbon, such as kerosene, water and surfactants and co-surfactants or solubilizers. Water-external emulsions may also be the "primary" or initially injected slug. Thereafter, various types of drive fluids, such as additional amounts of emulsions, water, polymer thickened water or liquified petroleum gas are injected into the formation and serve to displace the fluids previously injected, the crude oil thereby being forced through the formation and being recovered through a separate production well.

U.S. Pat. Nos. 3,036,631, dated May 29, 1962, to Holbrook and 3,195,629, dated July 20, 1965, to Leach, suggest improved water-flooding methods which employ oxidized oils; however, it should be noted that the processes there disclosed are markedly different from the process of the present invention as more fully described herein.

Such soluble oil slugs described in the prior art have generally been composed of about 50 to 70 volume percent hydrocarbon, about 20 to 40 volume percent water and minor proportions of an anionic, cationic or nonionic surfactant, and an additional ingredient alternatively described as a solubilizer, co-solvent, coupling agent or co-surfactant, particularly a lower alkanol such as ethanol or isopropanol. The total amount of the latter two components has been in the range of about 10 to 20 percent by volume, with the alcohol portion being usually in the range of 4 to 10 percent and preferably about 5 to 6 percent by volume.

The need for incorporation of these solubilizing compounds in the initially injected oil-soluble external emulsion slug has had a significant effect upon the potential large-scale commercialization of miscible oil secondary-type recovery procedures. While the percentage of surfactant and coupling agent or co-surfactant is relatively minor, the overall amount required is quite substantial since very large quantities of emulsion slug must be employed in order to flood the formation. The net effect is a significant cost factor for such soluble oil emulsion slugs. Effective reduction or replacement of these expensive ingredients, particularly the lower alcohols, is a current objective of those in the industry.

The present invention is based on the discovery that certain oxidized or amidized-oxidized hydrocarbons may be employed, either wholly or partially, as the oleaginous component of such oil external or water-external emulsions and such emulsions function very effectively as slugs for miscible oil recovery procedures. Such treated hydrocarbon-containing emulsion slugs eliminate or reduce substantially the quantity of alcohol co-surfactant which has heretofore been an essential requirement for emulsion stability and function highly effectively in miscible flooding process for the recovery of crude oil.

According to the present invention, the process for recovering crude petroleum from subterranean formations having drilled therein at least one each of a production well and an injection well comprising injecting into the formation a water-external or oil-external emulsion slug and thereafter injecting into said formation a drive fluid in amounts sufficient to displace the crude petroleum is improved by utilizing as said slug an oil-external or water-external emulsion comprising (a) at least about 20 percent by volume of an oleaginous component being a member of the group of (i) oxidized petroleum hydrocarbons, (ii) amidized-oxidized petroleum hydrocarbons, said hydrocarbons including both crude oil itself as well as distilled petroleum hydrocarbon fractions, and (iii) mixtures of same with untreated petroleum hydrocarbons, said mixtures containing at least 10 percent by volume of said oxidized or amidized-oxidized hydrocarbons; (b) an anionic, nonionic or cationic surface-active agent; (c) 0 to about 3 percent by volume lower alkanol co-surfactant and (d) the balance water.

The oleaginous component should contain at least about 10 percent by volume of oxidized or amidized-oxidized hydrocarbons in order to significantly reduce the amount of alcohol co-solvent required to prepare a suitable oil-external or water-external emulsion. Preferably the oleaginous component will contain at least 50 percent by volume of oxidized or amidized-oxidized hydrocarbons blended with untreated hydrocarbons and this preferred range includes an oleaginous component which is composed solely of an oxidized or amidized-oxidized hydrocarbon. Distilled hydrocarbon fractions suitable for use in these emulsions generally comprise those boiling in the range of about 100°F. to 900°F., i.e., from the lower-boiling naphthas through the kerosene-diesel oil boiling point range and higher, into the lubricating oil range. The oxidized hydrocarbons are preferably prepared from fractions boiling in the 350°F. to 625°F. range, such as kerosene and diesel fuel.

Crude oil itself is also suitable for employment as an oxidizable hydrocarbon in accordance with the present invention. Preferably, a low pour point crude is employed, such as the Gulf Coast and South American crudes, which are also referred to as naphthene-based crudes. For optimum results the crude oil should be a solvent dewaxed crude and any light ends should have been distilled off, i.e., it should be a topped crude. Of course, when crude oil is used, only a liquid phase oxidation procedure can be employed and for this reason the use of crude oil itself as an oxidizable petroleum hydrocarbon is distinctly less preferable than the use of the aforesaid distilled petroleum hydrocarbon fractions generally and particularly petroleum fractions boiling in the range of 350°F. to 625°F. Nevertheless, the term "petroleum hydrocarbon" as used herein is intended to include both crude oil itself and the various distilled fractions thereof.

The hydrocarbon fractions may be oxidized either by liquid or vapor phase oxidation. Air is the preferred oxidizing agent, but mixtures of oxygen with other inert gases, or even pure oxygen, may be employed.

Liquid phase oxidation is carried out, for example, at a temperature range between about 250°F. and 350°F. utilizing air as the oxidizing agent or in the presence of catalysts such as manganese or cobalt naphthenate.

Vapor phase oxidation is preferred because of the shorter reaction time, i.e., about 5 seconds or less. This oxidation procedure is preferably carried out between temperatures of about 650°F. to 900°F. The hydrocarbon fraction to be oxidized in the vapor phase is mixed with water, preheated, vaporized and contacted with an air stream in the reactor, the volume ratio of water to oil being about 0.4 to 1 and the volume ratio of air to oil being about 50–120 to 1 cubic feet of air per gallon of oil.

As is usual with the oxidation of complex mixtures of hydrocarbons, the exact composition of the oxidized product is not precisely known. What is produced is a partially oxidized hydrocarbon mixture wherein the oxidation products comprise a complex mixture of carboxylic acids and esters with lesser amounts of aldehydes, alcohols, ketones and diketones, all having a wide molecular weight range distribution. For the purposes of the present invention, the term "oxidized hydrocarbon" as used herein is defined as an oxygen treated hydrocarbon mixture having a degree of conversion to oxidized products of between 10 and 60 percent by weight. This degree of conversion is conveniently measured by a clay percolation adsorption technique wherein the oxidation products are retained on a fuller's earth adsorbent.

More specifically, this clay percolation adsorption test is carried out by dissolving 2 grams of oxygenated hydrocarbon in 100 ml. of isohexane and the solution is passed through a cylindrical 50 cm. length of 18 mm. glass tubing containing 40 grams of 30/60 mesh fuller's earth stoppered with absorbent cotton and tapered to a 2 mm. opening. The solution is allowed to pass through the adsorbent and the percolated solution is caught in a tared vessel. The isohexane is vaporized off at 350°F. and the filtrate is allowed to cool. The vessel is weighed to determine the amount of unadsorbed hydrocarbon and the amount of oxidized products retained by the adsorbent is found by difference.

While the oxidized hydrocarbon may be used as such, it is particularly preferable to further treat the oxidized product with an amidizing agent. The amidation reaction may be carried out using a wide variety of amino compounds. Exemplary are ammonia, primary and secondary alkyl amines such as methylamine, dimethylamine, propylamine, methylethyl-i-propylamine as well as amines having a higher alkyl group, such as di-soyaamine, dodecylamine and others where the alkyl has up to about 18 carbon atoms. Also suitable as amidizing agents for reaction of the aforedescribed oxidized hydrocarbon are the lower alkanolamines such as monoethanolamine, diethanolamine, isopropanolamine, butanolamine, N-methylethanolamine and the like, having up to about 10 carbon atoms. Particularly preferable are ammonia and the normally gaseous primary amines such as methylamine and dimethylamine. The amidation is preferably carried out at 200°F. to 300°F.

The emulsions prepared for use in the process of the present invention may be either of the oil-external type or the water-external type. In either case, the beneficial effects resulting from the use of an oxidized or amidized-oxidized hydrocarbon as the oleaginous phase are realized. Of course, the employment of water-in-oil emulsions is particularly preferred. Nevertheless, the choice of a suitable surfactant will be related to the type of emulsion desired. Primarily lipophilic or oil-soluble surfactants will be used in preparing water-in-oil emulsions and primarily hydrophilic or water-soluble surfactants will be utilized in preparing oil-in-water emulsions.

Surfactants suitable for preparing the preferred water-in-oil type emulsions of the present invention are the primarily oil-soluble anionic, nonionic and cationic surfactants. A particularly suitable class of anionic surfactants are the higher alkylbenzene and polyaryl monosulfonates such as the oil-soluble alkyl naphthyl monosulfonates wherein the alkyl radical contains from about 10 to 25 carbon atoms. Exemplary are sodium alkylaryl monosulfonates having a molecular weight range of about 450 to 550. These sulfonates may be employed, and in most cases it is particularly preferable to do so, as mixtures with primarily water-soluble sodium alkylaryl sulfonates having a molecular weight range of about 330 to 350. Such mixtures may contain up to about 20 percent by weight of the latter sulfonate and will still retain a primarily oil-soluble characterization.

Other primarily oil-soluble anionic surfactants suitable for use herein are the sodium salts of esters of short-chain sulfocarboxylic acids, sodium dioctyl and dihexylsulfosuccinate, long chain carboxylic acids such as oleic acid and tall and fatty acids, higher molecular weight, oil-soluble complex phosphate esters prepared by phosphorylating aliphatic alcohols and alkyl phenols with $P_2O_5$.

Suitable lipophilic nonionic surfactants include the 1 to approximately 5 mol ethylene oxide adducts of (*i*) alkyl phenols such as tertiary octyl- or nonylphenol, (*ii*) $C_{10}$ to $C_{20}$ aliphatic alcohols including Oxo alcohols, (*iii*) $C_{10}$ to $C_{20}$ fatty acids and the like. Other nonionics include diethanolamine-fatty acid condensates such as oleic diethanolamide, the esters of $C_{16}$ to $C_{18}$ fatty acids with glycerol and the dimeric to hexameric polyglycerols, sorbitan fatty acid esters and ethoxylated derivatives thereof, higher molecular weight, i.e., above about 1,000, propylene oxide-propylene glycol condensates and the like.

Suitable cationic surfactants of a primarily oil-soluble nature are the higher molecular weight fatty amines, the dialkyl dimethyl quaternary ammonium chlorides, fatty acid amides of diethylene triamine and the like.

Suitable water-soluble surfactants are well known and are exemplified by anionic surfactants such as the water-soluble alkali metal and amine salts of fatty acids, the water-soluble salts of organic sulfonic acids, alkyl sulfuric acids and esters of polyhydric alcohols, sulfated and sulfonated higher fatty acid amides and alkanolamides, sulfates straight and branched chain $C_8$ to $C_{20}$ alcohols, sulfated alkanolamides and the like. Also suitable are the alkane sulfonates, the olefin sulfonates, the alkyl aryl sulfonates such as those having 6 to 26 carbon atoms in the alkyl chain, phosphate esters of $C_6$ to $C_{18}$ aliphatic alcohols and alkyl phenols. Particularly suitable are those hydrophilic anionics wherein the solubilizing group is $SO_4H$, $SO_3H$ or $COOH$ and the alkali metal, alkaline earth metal, ammonium, lower amine and alkanolamine salts.

Primarily water soluble nonionics include the ethylene or propylene oxide condensates with long chain fatty alcohols, fatty acids, fatty amides and fatty amines, propylene oxidepropylene glycol condensates and the like. Typical of the water-soluble cationics are the quaternary ammonium compounds such as the $C_{10}$ to $C_{18}$ alkyl trimethyl ammonium halides, alkyl pyridinium halides, fatty substituted imidazoline compounds, quaternary salts of amino amides, N-alkylamine acetates and the like.

It is significant feature of the present invention that the emulsions prepared using the oxidized hydrocarbon fraction as disclosed herein require minimal amounts of alcohol co-solvent to be effectively stabilized. Only about 3 percent or less alcohol is required in the oil-external emulsions of the present invention. Moreover, no alcohol co-solvent at all is needed when the oleaginous phase is composed totally of the oxidized or amidized-oxidized fraction. Heretofore prior art soluble oil emulsion slugs required 3 to 5 percent or more of alcohol co-solvent, such as ethanol, n-amyl alcohol or isopropanol.

The emulsions are prepared utilizing conventional techniques, for example, when the preferred oil-external emulsions are prepared, first the oleaginous component and surfactant are blended at room temperature. Then the water is added. The alcohol co-solvent, if present, is added as the last component. Ethanol, n-amyl alcohol and isopropanol are the preferred alcohols. Generally, monohydric alkanols containing up to about 8 carbon atoms may be employed.

Particularly preferred emulsions are those of the water-in-oil type wherein the oleaginous phase contains 50 percent or more oxidized hydrocarbon fraction, particularly oxidized diesel fuel, blended with 50 percent untreated hydrocarbon fraction. Such emulsions may contain less than about 2 percent by volume alcohol co-solvent.

Another equally preferred embodiment are emulsions wherein the oleaginous phase contains at least about 50 percent of an amidized oxidized hydrocarbon fraction, particularly one derived from a fraction boiling in the diesel fuel range, the balance of the oleagineous component being the untreated hydrocarbon. The amidation is preferably carried out utilizing gaseous ammonia as the amidizing agent at either atmospheric or super-atmospheric pressures and at a temperature of about 200° to 300° F. It has been found that such emulsion slugs require not more than about 2 percent by volume alcohol co-solvent to produce stable emulsions which function effectively as the initially injected fluid for secondary type crude oil recovery techniques.

The surfactant for these preferred oil-external emulsions will be a mixture of alkylaryl sodium monosulfonates having a molecular weight of 450 to 550 with very minor proportions of lower (300–350) molecular weight water-soluble sulfonates of the same type. The overall proportions for these emulsions will be 60 to 65 percent by volume aqueous component, 30 to 35 percent by volume oleaginous component, 5 to 15 percent by volume surfactant and 1 to 2 percent by volume alcohol co-solvent, if present.

In the process of the present invention, the aforedescribed oxidized oil-containing soluble-oil emulsion slug is first injected into an oil-bearing subterranean formation. The amount injected is generally about 3 to 20 percent of the pore volume of the formation being treated. Thereafter, a drive material is injected to push the soluble oil slug through the formation. Suitable drive materials include water-external emulsions, liquefied petroleum gas, gases such as nitrogen, carbon dioxide, natural gas, etc., water and thickened water. Preferably water containing a polymeric thickening agent such as polyacrylamide is employed. A number of drive fluids of varying viscosity can be employed such as disclosed, for example, in U.S. Pat. No. 3,261,399.

The emulsions prepared utilizing the aforesaid oxidized or amidized-oxidized hydrocarbon will be stable and effective over a wide range of viscosities. The exact viscosity will be dependent on a number of factors, primarily the mobility factor of the fluids in the particular formation being treated. In the art of secondary and tertiary recovery processes using emulsion slugs, the viscosity should be adjusted according to the mobility required to effectively move the reservoir fluid through the formation.

It should be noted that no novelty per se is claimed in the utilization of miscible fluids comprising oil-external emulsions in secondary-type recovery techniques. The invention described herein resides in a significant improvement in the process, i.e., the utilization of emulsion slugs containing oxidized or amidized-oxidized hydrocarbons with the concomitant reduction of elimination of the heretofore required level of alcohol component.

The invention is further illustrated by the following examples which are not to be considered as limitative of its scope.

EXAMPLE 1

A diesel fuel fraction boiling in the range of 390° F. to 625° F. is subjected to oxidation in the vapor phase at a temperature of 785° F. by contact with an air stream. The oil is pre-mixed in the liquid phase with 70 percent by volume water before oxidation. The ratio of air to oil was 105 to 1 (ft. 3/gal.). The extent of oxidation is measured as 51.8 percent, as defined hereinabove, by clay adsorption. 50 parts of this oxidized product are blended with 50 parts of untreated diesel fuel. To 30 parts by volume of this oil blend are added 8.5 parts of a sodium petroleum sulfonate (mixture of 90 percent oil soluble sodium alkylaryl sulfonate of molecular weight 450 to 550 and 10 percent water-soluble sulfonate of molecular weight 300 to 350), 60 parts of water and 1.5 parts n-amyl alcohol. A stable water-in-oil emulsion is formed having a viscosity of 30 centipoises at room temperature.

A 4 ft. long by 2 in. diameter sandstone core containing brine and residual crude oil (35 percent brine saturation, 65 percent oil saturation) is flooded with 5 percent volume of the above-described soluble-oil emulsion slug and thereafter with water as the drive fluid. The oil recovered is 60 percent of the oil-in-place.

EXAMPLE 2

Example 1 is repeated in all respects except that (1) the oxidized hydrocarbon fraction is amidized utilizing ammonia as the amidizing agent, the amidation reaction being carried out at 250° F. for a period of seven hours, (2) the oleaginous phase contains 10 parts of oxidized-amidized hydrocarbon and 90 parts of untreated diesel fuel, and (3) about 1 percent ethanol is employed.

EXAMPLE 3

A kerosene fraction is subjected to air oxidation in the liquid phase at a temperature of 250° F. for a period of 10 hours with manganese naphthenate catalyst (1.4 grams per lb. of kerosene). Conversion to oxidized products is about 30 percent. The treated stock is then immediately reacted with gaseous ammonia at a pressure of 30 p.s.i.g. and a temperature of 250° F. for about 5 hours. The amount of ammonia reacted is stoichiometrically based upon the acid number of the oxidized product.

40 parts by volume of this amidized-oxidized fraction are combined with 10 parts by volume of the sulfonate of Example 1 and 50 parts by volume of water to form an oil-external emulsion.

The emulsion exhibits good long-term stability and has a viscosity of 25 centipoises at room temperature. It is of particular note that no alcohol co-solvent is necessary to stabilize this emulsion, wherein the oleaginous phase is not blended with any untreated hydrocarbon.

As in Example 1, a sandstone core is treated with this composition and equivalent results are obtained with regard to the quantity of oil recovered.

EXAMPLE 4

50 parts by volume of the amidized-oxidized kerosene fraction of Example 3 are blended with 50 parts by volume of untreated kerosene. A water-external emulsion is prepared utilizing 30 parts by volume of the oil blend, 60 parts by volume of water and 10 parts by volume of a water-soluble sodium alkyl-aryl monosulfonate (mol. wt. 330–350) and 3 parts by volume $n$-amyl alcohol. As in Example 1, a sandstone core is treated with this emulsion and thereafter with water as the drive fluid. The oil recovered is 40 percent of the oil-in-place.

EXAMPLE 5

A hydrocarbon fraction boiling in the range of 250°F. to 350° F. is oxidized in the liquid phase at a temperature of 200° F. using air as the oxidizing agent and 0.5 percent by weight cobalt naphthenate catalyst for a period of 72 hours. The degree of conversion is measured at 30 percent by clay percolation adsorption as described herein. The oxidized fraction is amidized with diethanolamine being added at 250° F. until the acid number of the mixture is less than 0.5.

50 parts by volume of this amidized-oxidized fraction are blended with 50 parts by volume of kerosene. An oil external emulsion is prepared utilizing 35 parts by volume of this blend, 57 parts by volume of water, 5 parts by volume of the surfactant of Example 1 and 3 parts by volume of ethanol. As in Example 1, a sandstone core is treated with this composition and equivalent results are obtained.

What is claimed is:

1. In a process for recovering crude petroleum from subterranean formations having drilled therein at least one each of a production well and an injection well comprising injecting into the formation a water-external or oil-external emulsion slug and thereafter injecting into said formation a drive fluid in amounts sufficient to displace the crude petroleum, the improvement which comprises utilizing as said emulsion slug a composition comprising:
   a. at least about 20 percent by volume of an oleaginous component being a member selected from the group consisting of ($i$) amidizable oxidized petroleum hydrocarbons, ($ii$) amidized-oxidized petroleum hydrocarbons of group ($i$) above, and ($iii$) mixtures of same with untreated hydrocarbons, said mixtures containing at least 10 percent by volume of said oxidized or amidized-oxidized hydrocarbons;
   b. an anionic, non-ionic or cationic surfactant;
   c. 0 to about 3 percent by volume lower alkanol co-solvent; and
   d. the balance water.

2. A process according to claim 1 wherein said emulsion slug is in the form of a water-in-oil emulsion.

3. A process according to claim 2 wherein said hydrocarbon fraction has a boiling point range of about 350°F. to 625°F.

4. A process according to claim 2 wherein said surfactant is a member of the group of the oil-soluble anionic, nonionic and cationic surfactants.

5. A process according to claim 4 wherein said surfactant is an oil-soluble sodium alkylaryl monosulfonate having a molecular weight of from about 450 to 550.

6. A process according to claim 5 wherein said emulsion contains from about 60 to 65 percent by volume aqueous component, 30 to 35 percent by volume oleaginous component and said oleaginous component containing at least 50 percent of an oxidized or amidized-oxidized hydrocarbon fraction, from about 5 to 15 percent by volume surfactant and 1 to 2 percent by volume alcohol co-solvent selected from the group consisting of ethanol, isopropanol and $n$-amyl alcohol.

7. A process according to claim 1 wherein said petroleum hydrocarbons are distilled fractions in the boiling point range of 100°F. to 900°F.

8. A process according to claim 1 wherein said oleaginous component is an amidized-oxidized hydrocarbon fraction.

9. A process according to claim 1 wherein said oleaginous component is a mixture of about 50 percent amidized-oxidized hydrocarbon fraction with about 50 percent untreated hydrocarbon fractions.

* * * * *